Dec. 13, 1960 J. J. JANSEN 2,964,682

POLARIZING CIRCUIT FOR TELEVISION SIGNALS OR THE LIKE

Filed May 5, 1959

INVENTOR
J. J. JANSEN
BY A. E. Hirsch Jr.
ATTORNEY

United States Patent Office 2,964,682
Patented Dec. 13, 1960

2,964,682

POLARIZING CIRCUIT FOR TELEVISION SIGNALS OR THE LIKE

Johannes J. Jansen, Topsfield, Mass., assignor to Bell Telephone Laboratories, Incorporated, New York, N.Y., a corporation of New York Filed May 5, 1959, Ser. No. 811,173

11 Claims. (Cl. 317—8)

This invention relates to the transmission of television signals or similar complex waves, and more particularly to the automatic determination and correction, if necessary, of the polarity of the signal.

A specific embodiment of the invention described below for illustrative purposes is termed a polarizer since a principal function of the circuit is to monitor the polarity of a transmitted video signal or the like and, if incorrect, to reverse its polarity so that a receiver will always receive a signal of the same polarity.

In the transmission of video signals in a carrier transmission system, and particularly in those systems employing what is known as "excess carrier ratio" modulation and "homodyne" detection, the absolute phase of the signal may become lost. This is because the demodulator employs at the receiving end of the system a local carrier oscillator with a control circuit to keep the frequency and phase of the local oscillator output the same as that of the signal carrier. As such, it has an inherent 180 degree ambiguity so that as signals are first applied, the oscillator may be controlled at the correct phase or at a phase 180 degrees therefrom. The video output of the demodulator may then have, with equal probability, either correct or inverted polarity and, with equal probability, may or may not reverse its polarity whenever the carrier of the signal is interrupted. Since it is generally desirable that the video signal have correct polarity at the receiver, means are necessary for monitoring polarity and, when necessary, restoring it to a pre-established phase.

A polarity recognition and automatic reversing circuit suitable for maintaining a constant polarity in such a system is described in B. M. Bowman-J. W. Rieke Patent 2,820,181 granted January 14, 1958. It is arranged to invert the polarity of a signal by means of a set of relay contacts which reverse the connection of a balanced video line between an input terminal and an output terminal. Ordinarily, the recognizer is bridged on the video line and produces an output of one character for signals of correct polarity and a distinctly different output for signals of incorrect polarity. The recognizer makes use of of the vertical blanking interval occurring in the video signal to recognize its polarity. In effect, it examines the amplitude extremities of the signal, i.e., the tips of video and the tips of synchronizing signals intercalated with the signal. For a normal video signal, complete with vertical blanking intervals, recurrent interruptions in the train of picture peaks indicate a signal of correct polarity. If the polarity is inverted, the regular recurrence of synchronizing signal tips, uninterrupted by vertical blanking intervals, indicates an inverted signal. The line relay used in the reversing circuit comprises part of a start-stop relay oscillator which is energized for a particular recognizer output; one that indicates incorrect polarity on the line. Immediately upon energization of the oscillator, the relay contacts reverse the polarity of the transmitted signal. The relaxation time of the oscillator spans several signal frames so that normally the contacts will reverse but once, since before the oscillator has completed half a cycle the recognizer will have adjusted to the correct polarity. At that time the line relay locks in the position that it then finds itself. The polarizer is thus eminently satisfactory for maintaining a signal in one polarity so long as vertical blanking information is present in the signal.

Satisfactory maintenance of transmission systems requires periodic testing of transmission facilities between terminal installations. If testing is achieved by transmitting, independently over the system, a standard video signal including vertical blanking information, the polarity of the test signal may be maintained in one phase without difficulty with the apparatus described above. However, various specialized test signals currently in use do not contain vertical blanking information. For example, test signals useful for measuring the differential gain and phase of a signal generally do not contain these intervals. Similarly, signals useful for setting levels, such as low frequency sine waves, so-called sine-square signals, various low repetition rate sweep signals and the like, often do not possess vertical blanking intervals. Consequently, since a recognizer of the type referred to above fails to sense idle periods in correct polarity signals of this form, it interprets these signals invariably as an inverted video signal rather than as a correct polarity test signal. As a result of this ambiguity, the test signal is cyclically reversed so long as it persists.

Similarly, non-standard television signal wave forms produced, for example, if the picture signal black level is adjusted to an arbitrary value in the blacker-than-black region, may cause polarity ambiguities. For the transmission of data signals over toll facilities, similar problems arise since data signals often fail to possess synchronizing information of a form that is detectable by the polarizers.

It is therefore necessary, before transmitting test signals of this sort over a system protected against unwanted phase reversals by automatic reversing circuits, to disable all such circuits in the entire network. In the case of extensive transmission systems employing a large number of repeaters, each employing a polarizer, complex switching equipment is necessary to effect the disablement of the recognizers. Alternatively, an operator at each repeater must unfailingly lock out the apparatus before a test signal is transmitted, and subsequently enable the polarizer upon the completion of the test transmission. Clearly such an operating procedure is cumbersome.

It is a principal object of the present invention to monitor the polarity of a transmitted video signal and, if incorrect, to restore proper polarity to the transmitted signal. More particularly, its object is to prevent polarity ambiguities from developing in a polarity recognizer in the event that non-standard test or data signals are transmitted through the recognizer.

According to the invention, a polarizer circuit is employed which recognizes the polarity of a standard video signal or the like, and automatically corrects for an inverted polarity by operating a line reversing relay. In the event that an ambiguous polarity condition is detected, as by the presence of specialized test signals, data signals, or the like, the polarizer circuit is automatically disabled only so long as the test signal is present. Hence, the tendency for the polarizer circuit to oscillate is minimized.

The polarizer, in its simplest form, employs two polarizer recognizer circuits, connected in a logic circuit configuration. One operates to reverse the polarity for incorrect standard signals and the other is used to disable the primary polarizer if a clear distinction of polarity cannot be made, e.g., in the case of non-standard test signals or the like. Accordingly, test or data signals of either polarity are passed without a polarity change. Likewise, standard video signals are passed appropriately corrected in phase when necessary. The two polarizers are preferably combined in a single circuit so that circuit economies may be realized.

The invention will be fully apprehended from the following detailed description of an illustrative embodiment thereof taken in connection with the appended drawings in which.

Figure 1:
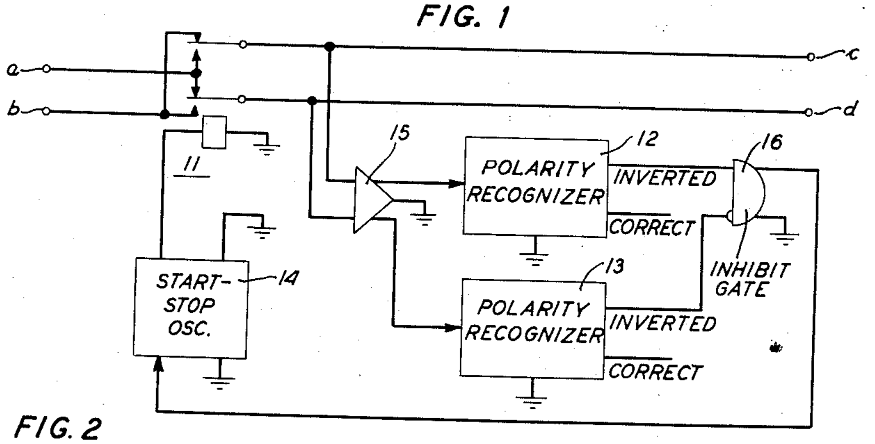
Fig. 1 illustrates in block diagram form a polarizer employing the principles of the invention.

Referring now to the apparatus drawings; Fig. 1 illustrates in simplified block schematic form, apparatus according to the invention for maintaining a complex signal wave in proper polarity despite the occasional presence of specialized test signals. A balanced video signal, for example, a demodulated television signal balanced with respect to ground is applied to the balanced input terminals *a*, *b*. The applied signal appears at the balanced output terminals *c*, *d* with a polarity depending upon the condition of the contacts of a reversing relay 11. The contacts and armatures of relay 11 constitute a double-pole double-throw switch by which input terminals *a*, *b* can be connected either to output terminals *c* and *d* or to terminals *d* and *c*, respectively.

Bridged across the line between the reversing relay 11 and the output terminals are a pair of polarity recognizers 12 and 13 whose function it is to monitor the polarity of the signal and to give different indications of correct and inverted polarity. Both of the polarity recognizers may be identical to the recognizer described fully in the above-mentioned Bowman-Rieke patent. The signals appearing on the line are applied to the recognizers by way of a balanced amplifier 15 arranged to supply contra-phaseal signals to the two recognizers. If the signals applied to terminals *a*, *b*, are standard television signals containing vertical blanking information and are of constant phase, one of the recognizers, for example recognizer 12, will sense the signal as a "correct" signal, and the other recognizer 13 will invariably sense it as an "incorrect" or inverted signal. If the signal is correct, no change in the line terminal connection is made. In the illustrative example, no output signal is generated by either of the recognizers for a detected correct phase condition. If, however, the polarity of the line signal is inverted as compared with the pre-established correct phase, recognizer 12 senses an inverted signal and produces an output signal which energizes a start-stop oscillator circuit 14, which in turn energizes relay 11. For this condition, recognizer 13 senses a correct signal. When so energized it operates to reverse the polarity of the signals at the output terminals. The relaxation time of the oscillator 14 is sufficiently long to permit the recognizers to adjust to a standard composite signal of normal polarity at the output terminals within the time of one oscillation thus to remove the energizing input from the oscillating circuit. When the polarity recognizer 12 once again detects and indicates correct signal polarity, the oscillator 14 stops and the relay remains in whatever position it is in at that time.

If, to the contrary, the signals applied to the terminals *a*, *b*, are not standard signals including vertical synchronizing information, but rather are specialized test signals or the like which do not contain vertical blanking information, both of the recognizers 12 and 13, sense an inverted signal. Consequently, the recognizer 12 produces an output signal indicative of the inverted polarity of the applied signal. However, recognizer 13 also produces an inverted condition signal. The signal produced by recognizer 13 is applied to gate 16 to inhibit the passage to the oscillator 14 of the signal produced by recognizer 12. Hence, the relay 11 is locked-out and the signals applied to terminals *a*, *b*, are passed without phase reversal.

While the signal passed by gate 16 normally is satisfactory for energizing relay 11 directly, the start-stop oscillator 14 is preferably employed because it insures a quick return to a proper polarity should a noise burst or the like induce the polarity monitoring means falsely to reverse signal polarity. Since the start-stop oscillator 14 requires an energizing input, in the event that no signal is present on the line, reversing relay 11 holds its previously established position.

As described fully in the Bowman-Rieke patent, the polarity recognizers may also be bridged across the video line ahead of the reversing relay. For reasons of noise susceptibility and the like, however, the reverse acting circuit shown in Fig. 1 is preferable.

Figure 2:
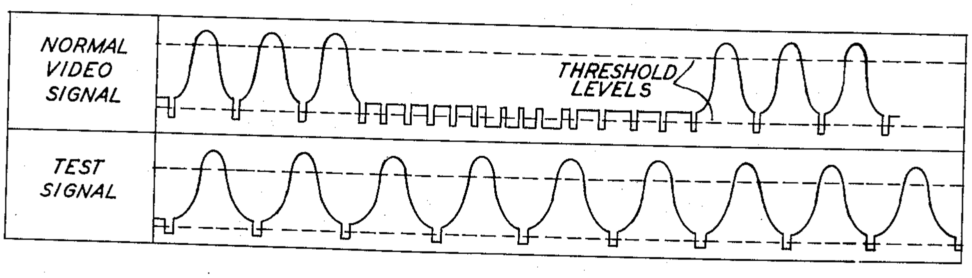
Fig. 2 is a set of curves which represents graphically various signal wave forms encountered by the polarizer.

Representative signals which may be presented to recognizers 12 and 13 are shown in Fig. 2. The input may comprise signals of correct or inverted polarity consisting either of what may be termed normal signals, i.e., picture signal intervals interspersed with vertical blanking intervals, or of test signals which lack the vertical blanking intervals. As a standard, the outputs of amplifier 15 may be arranged to present to recognizer 12 signals in which the synchronizing pulses extend in the positive direction for inverted signals and in the negative direction for signals of correct polarity. Only the extremities of the waves, i.e., portions above and below pre-established threshold levels of amplitude (above and below an arbitrary zero axis), are utilized by the recognizers to distinguish between correct and inverted polarity signals. It is seen that for a normal signal the opposite extremities above and below the threshold levels are of two different forms. The tips of picture information are periodically interrupted by vertical blanking intervals; the tips of synchronizing pulses are not so interrupted. Since the duty cycle of the two sequences is substantially different one from the other, a pulse width discriminator or the like may be used to produce distinctly different outputs for the two sequences. For a test signal, however, the opposite extremities are substantially identical, so that a clear distinction between the two conditions cannot be established on this basis.

Figure 3:
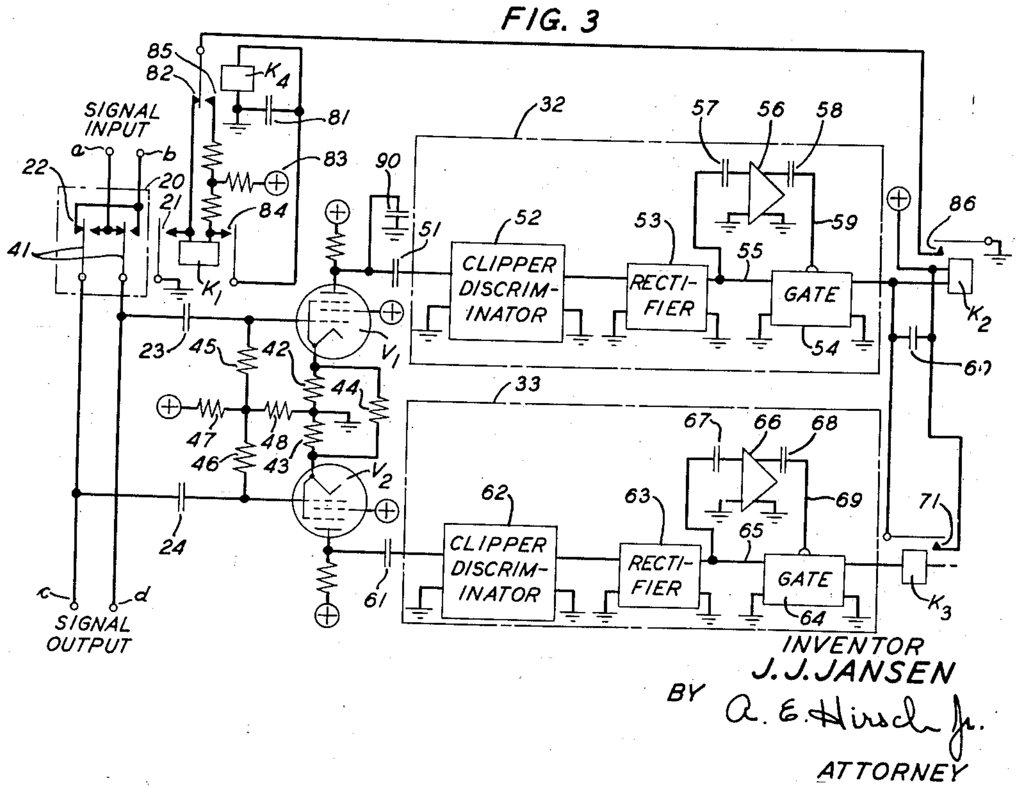
Fig. 3 is a detailed circuit schematic diagram, partially in block schematic form, of polarizer apparatus in accordance with the invention.

A polarizer is shown in Fig. 3 that is eminently suitable for distinguishing between the forms of applied signals illustrated in Fig. 2, and correcting the polarity of normal signals only. A balanced video signal enters the circuit at terminals *a*, *b* and leaves on terminals *c*, *d* after passing through a reversing switch comprising the armatures 41, and associated contacts 22, of relay K1. The control grids of vacuum tubes V1 and V2 are bridged across the output terminals *c*, *d* through a pair of coupling capacitors 23 and 24. These two tubes constitute a balanced-to-unbalanced video amplifier with high longitudinal suppression, the circuit, in fact, being a variation of one disclosed in a patent of S. Doba, No. 2,226,238, dated December 24, 1940. The cathode resistors 42 and 43 which are bridged by a third resistor 44 supply degenerative feedback and also the large suppression to longitudinal currents which is necessary to discriminate between metallic and longitudinal currents. The cathodes are elevated above ground by these resistors so that the control grids are also biased positively, being returned through individual resistors 45 and 46 to a voltage divider 47—48 to which a positive voltage is applied.

Output from V1 is applied through a coupling capacitor 51 to polarity recognizer 32. The recognizer includes a clipper-discriminator 52 which acts both as a signal amplitude clipper and as a pulse width discriminator. It retains only the extremity of the signal above a threshold level and distinguishes, by differences in the peak-to-peak amplitude of its output, between correct and inverted polarity. The output of the clipper-discriminator is rectified by a rectifier 53 which has a time-constant that is fast compared with 60 cycles but slow compared to 15 kilocycles. In the case of standard television signals, the output of the rectifier consists substantially of direct current for inverted signals (synchronizing pulses positive) and direct current plus a 60 cycle pulse for correct picture signals. A direct current signal only is produced for test signals of either polarity. The input 55 of the gate 54 to which the output of the rectifier is applied is an enabling input. Hence, an input above the threshold level permits the gate to produce an output signal. To prevent false operation of the gate when the signal polarity of a normal signal is correct, that is, for picture signals which include a 60 cycle component, the output of the rectifier 53 is also applied by way of capacitor 57 to an amplifier 56 whose output is coupled to a second input 59 of the gate 54 through a coupling capacitor 58. Input 59 is in the nature of an inhibiting input since signals above the threshold level applied to this input will inhibit the gate and prevent its producing an output regardless of the character of the signal applied to its enabling input 55. The gate 54 thus produces an output sufficient to operate a relay K2 whenever the polarity of a normal signal applied to recognizer 32 is incorrect.

When relay K2 is operated, contact 86 is closed and the start-stop oscillator is energized thus to reverse the contacts of line reversing relay K1 and to invert the polarity of signals applied to terminals *a*, *b*. A signal that lacks vertical blanking intervals does not produce the 60 cycle component which constitutes the inhibiting pulse. Thus, the relay K2 is energized for all but correct polarity video signals that include vertical blanking information.

The start-stop oscillator comprises the circuit including relays K1 and K4. The relay oscillator forms the subject matter of J. W. Rieke Patent 2,820,157 granted January 14, 1958. Its period is controlled by the capacitor 81 which shunts the winding of relay K4. When relay K2 is operated, it connects the winding of relay K1 to ground through a back contact 82 on relay K4 and causes relay K1 immediately to operate. Relay K1 in operating reverses the signal polarity at the output terminals by the action of armatures 41 associated with reversing contacts 22. It also operates relay K4 by applying potential from a battery 83 to its winding through a back contact 84 on relay K1. The operation of relay K4 is delayed by the time necessary to charge the capacitor 81 to a value sufficient to operate relay K4. When energized, relay K4 effectively removes the battery potential from relay K1 by connecting the relay to ground through contact 85 associated with relay K4 and contact 86 associated with relay K2. When relay K1 releases, it removes battery potential from relay K4; K4 remains energized, however, until the capacitor 81 discharges. As soon as relay K4 releases, relay K1 again operates and the cycle repeats itself. This process continues until relay K2 is released at which time relay K1 remains in whatever position it is in at the instant of release, and relay K4 eventually assumes a condition identical to that of relay K1. It will be noted that relay K4 in effect follows the operation of relay K1, though delayed by a period established by the charge character of capacitor 81. In most instances relay K1 will reverse, i.e., operate or release, just once or not at all depending upon the input signal polarity since the charging and discharging time of capacitor 81 is selected to span several frames of the video signal. This is sufficient time for the recognizer circuit 32 to adjust to the correct polarity and release relay K2 before relay K1 can reverse the second time. With the oscillating feature, however, the circuit quickly restores correct polarity on the line should a noise burst or the like induce false operation in the reversing relay. In any case, relay K1 continues to reverse the line connections until correct polarity is restored.

Video signals passed by amplifier $V_2$ are applied through coupling capacitor 61 to polarity recognizer 33. They are inverted in polarity as compared with signals simultaneously applied to recognizer 32 so that, in effect, recognizers 32 and 33 simultaneously examine applied video signals with opposite views as to what constitutes a correct and an incorrect polarity condition for the signal. The operation of recognizer 33 is identical in all respects with the operation of recognizer 32. It includes a clipper-discriminator 62, a rectifier 63, and an amplitude sensitive gate 64 inhibited by signals passed by capacitor 67 and amplifier 66. When an inverted signal is detected, gate 64 passes a signal sufficient to energize a relay K3. When relay K3 is energized, contact 71 is closed and the operation of relay K2 is inhibited. For correct polarity signals applied to recognizer 33, gate 64 is inhibited and produces no output.

Considering now the operation of both recognizers 32 and 33 operating together, a normal signal of correct polarity applied to the input terminals *a*, *b* appears at the input of recognizer 32 in correct polarity and relay K2 is not operated. The signal appears as an inverted polarity signal at the input of the recognizer 33. Recognizer 33 senses the signal as one of inverted polarity and relay K3 is energized. Since K2 is not energized, however, relay K1 remains in its rest position and signals pass from input terminals *a*, *b* to put output terminals *c*, *d* without a phase inversion. When a normal signal of inverted polarity is applied to terminals *a*, *b*, it is applied to recognizer 32 as an inverted signal, and to recognizer 33, in what appears to recognizer 33, as a correct signal. Accordingly, recognizer 32 senses an inverted signal and relay K2 is operated. Since recognizer 33 senses a correct signal, gate 64 is inhibited and relay K3 is not energized. When relay K2 closes, the relay oscillator is excited and the polarity at the output terminals *c*, *d* is corrected. As soon as the signal is inverted, however, recognizer 33 senses an incorrect signal and recognizer 32 observes a correct signal. Gate 64 associated with recognizer 33 immediately produces a signal sufficient to energize the relay K3 which applies a short circuit across the winding of relay K2. By this time, however, relay K2 is released since the recognizer 32 senses a correct signal. Hence, it has no effect and the relay oscillator is not energized.

This sequence of operations prevails for all correct polarity standard signals applied to terminals *a*, *b*, i.e., gate 54 is normally inhibited so that the contacts of relay K2 normally remain open, and the relay oscillator remains inoperative. Gate 64 is normally operative so that relay K3 is normally energized.

For an applied test signal devoid of vertical synchronizing information, both recognizers sense an inverted polarity signal. When recognizer 33 initially senses an inverted polarity, it operates relay K3 which applies a short circuit across the winding of relay K2. This prevents initiator relay K2 from operating even although an energizing signal is passed by gate 54 as a result of a detected incorrect signal. Relay K2 is thus disabled and the relay oscillator is not activated.

In order for the start-stop oscillator to remain in the condition established by standard video signal in the event that a test signal is transmitted through the system, it is essential that, as the test signal is applied, relay K3 operates before relay K2. Accordingly, the action of the recognizer 32 is delayed as compared with the action of the recognizer 33. This may be conveniently achieved by the addition of a capacitor 60 connected in parallel with the winding of relay K2. The charging time required by this capacitor insures that relay K3 has sufficient time to operate before the contact 86 or relay K2 is closed. It is also essential that the delay between the operation of the two recognizers is short as compared with the period of the start-stop oscillator. The capacitor 60 also prevents an instantaneous release of relay K2 when the start-stop oscillator corrects the polarity of an applied signal. However, relay K2 must release before the start-stop oscillator inverts the signal a second time. Consequently, the start-stop oscillator period and the time-constant of relay K2 are adjusted to meet both of these conditions.

Since sine wave signals are frequently used in testing transmission facilities, the recognizers must respond to such a signal and treat it in a fashion identical to that for other test signals, i.e., recognizer 32 must be locked out for the period during which such a signal is applied to terminals *a*, *b*. If the frequency response of both amplifier $V_1$ and recognizer 32, and amplifier $V_2$ and recognizer 33 are identical, i.e., if bandwidths are the same for both, an applied sine wave, of sufficiently high frequency, is ignored both by recognizers 32 and 33 so that gates 54 and 64 are not energized and the sine wave signal is passed to terminals *c*, *d* without inversion. If, to the contrary, the bandwidths of the two circuits, are not identical, e.g., the bandwidth of recognizer 32 is wider than that of recognizer 33 for a given frequency, conceivably recognizer 32 would operate and 33 would not. Hence the relay oscillator would cyclically reverse the signal. To guard against this possibility, the transmission bandwidth of amplifier $V_2$ and recognizer 33 is preferably wider than the transmission bandwidth of $V_1$ and recognizer 32. Capacitor 90, shunting the plate of $V_1$ to ground may be used to insure that this condition exists.

It is evident that with the apparatus described above, polarity ambiguities are effectively removed and all tendencies of the circuit to oscillate are removed. For standard television signals or the like which include vertical blanking information, correct polarity of the output signal is insured. For non-standard signals, those which are devoid of vertical synchronizing information, the circuit retains whatever polarity was established by the previous standard signal.

Considerable circuit economy may be obtained by combining portions of the individual recognizers into a unitary circuit. Furthermore, various other circuit arrangements may be devised by one skilled in the art to effect the necessary sequence of operations described above with regard to a typical illustrative embodiment of the principles of the invention. Various other modifications and extensions will occur to one skilled in the art.

What is claimed is:

1. In combination, a source of signals, controllable means for reversing the polarity of said signals, means for transmitting said signals through said controllable means, first monitoring means supplied with said signals for deriving control signals indicative of the polarity of the monitored signals, gating means supplied with signals derived in said first monitoring means for producing an output only in response to signals indicative of one polarity, means supplied with signals from said source for altering the phase thereof, second monitoring means supplied with said signals of altered phase for deriving control signals indicative of the polarity of the monitored signals, means responsive to signals produced by said second monitoring means for inhibiting the output of said gating means only for signals representative of one polarity, and means for utilizing the output of said gating circuit to energize said controllable means.

2. In combination, a source of signals, controllable means for reversing the polarity of said signals, means for transmitting said signals through said controllable means, first monitoring means supplied with said signals in one phase condition for deriving control signals indicative of the polarity of the monitored signals, gating means supplied with signals derived in said first monitoring means for producing an output only in response to signals indicative of one polarity only, means supplied with signals from said source for inverting the phase thereof, second monitoring means supplied with said signals in inverted phase for deriving control signals indicative of the polarity of the monitored signals, means responsive to signals produced by said second monitoring means for inhibiting the output of said gating means only for signals representative of said one polarity, and means for utilizing the output of said gating circuit to energize said controllable means.

3. In combination, a source of signals of either correct or inverted polarity for which correct polarity is desired, controllable means for reversing the polarity of said signals, means for transmitting said signals through said controllable means, amplifier means supplied with said signals for producing contra-phaseal amplifications of said signals, first means supplied with amplified signals in one of said phase conditions for producing output signals for applied inverted polarity signals, second means supplied with amplified signals in the other one of said phase conditions for producing inhibiting signals for applied inverted polarity signals, gating means supplied both with said output signals and with said inhibiting signals for producing control signals only in the presence of said output signals and in the absence of said inhibiting signals, and means for utilizing said control signals to energize said controllable means.

4. The combination in accordance with claim 3 wherein said gating means operates to produce control signals in the presence of applied output signals only after a pre-established delay interval following the application of an inhibiting signal to said gating means.

5. Polarity correction apparatus for television signals having synchronizing pulses occurring periodically at relatively closely spaced intervals intercalated with picture information comprising, first and second polarity recognizers, said recognizers producing distinctively different indications in response respectively to applied television signals of a first polarity and to applied television signals of the opposite polarity, balanced amplifier means supplied with said signals for supplying contra-phaseal amplifications of said signals respectively to said first and said second polarity recognizers, gating means supplied with said indications produced by both said first and said second recognizers for producing control signals only upon the application of selected ones of said indications, and means responsive to said control signals for reversing the phase of said television signals.

6. Polarity correcting apparatus as defined in claim 5 wherein said means for reversing the phase of said television signals comprises start-stop oscillator means which start and continue oscillation in response to said control signals, and switching means responsive to oscillations of said oscillator for reversing the polarity of said television signals.

7. Polarity correcting apparatus as defined in claim 5 wherein said indications selected for energizing said gating means represent television signals of said first polarity applied to both of said recognizers.

8. Polarity correcting apparatus for television signals having synchronizing pulses occurring periodically at relatively closely spaced intervals intercalated with picture information comprising, first and second polarity recognizers, said recognizers producing distinctively different output signals in response to applied television signals of a first polarity and to applied television signals of the opposite polarity, balanced amplifier means supplied with said signals for supplying contra-phaseal amplifications of said signals respectively to said first and said second polarity recognizers, gating circuit means biased to produce an output only in response to applied signals above a predetermined threshold value, means for applying the output signals of one of said recognizers to said gating circuit means to energize it for applied signals indicative of signals applied to said amplifier means of one polarity, means for applying the output signals of the other one of said recognizers to said gating circuit means to inhibit its operation for applied signals indicative of signals applied to said amplifier means of said one polarity, and switching means responsive to said control signals for reversing the phase of said television signals.

9. Polarity correcting apparatus as defined in claim 8 wherein said gating circuit means comprises a logic inhibit circuit whose response to said energizing signals is slow as compared with its response to said inhibiting signals.

10. Polarity correcting apparatus as defined in claim 8 wherein said gating circuit means comprises a first electro-mechanical relay, said first relay being energized by the output signals produced by said first polarity recognizer, said first relay having contact means associated therewith for controlling the energization of said switching means, capacitor means connected in parallel with said first relay, a second electro-mechanical relay, said second relay being energized by said second polarity recognizer, said second relay having contact means associated therewith for establishing, when said second relay is activated, a direct current connection in parallel with the first one of said relays.

11. Polarity correcting apparatus as defined in claim 8 wherein said first and said second polarity recognizers comprise respectively a clipper biased to pass only applied signals above a clipping level which, for inverted signals, is greater than the amplitude of said picture signals but less than the amplitude of said synchronizing pulses, a rectifying circuit connected to the output of said clipper and having a time-constant which is fast as compared with sixty cycles and slow as compared with fifteen kilocycles, amplitude-sensitive gating means having an enabling input and an inhibiting input, a direct-current coupling circuit connected between the output of said rectifying circuit and said enabling input, means for biasing said gating means conductive for rectified synchronizing pulses of inverted polarity and non-conductive for rectified synchronizing pulses of correct polarity, and means for inhibiting conduction by said gating means in response to rectified picture signals of correct polarity which may be passed by said clipper, said inhibiting means comprising a circuit substantially opaque to the transmission of rectified synchronizing pulses of either polarity connected between the output of said rectifying means and said inhibiting input signal.

References Cited in the file of this patent

UNITED STATES PATENTS 2,820,181 Bowman ---------------- Jan. 14, 1958
2,892,945 Ule ------------------- June 30, 1959